United States Patent
Plath (10) Patent No.: US 7,207,917 B2
(45) Date of Patent: Apr. 24, 2007

(54) TRANSMISSION DEVICE COMPRISING AN ECCENTRIC POWER TRANSMISSION AXLE THAT IS DISPOSED ON THE BEARING AXLE

(76) Inventor: Klaus Plath, St. Michelner Nebenstrasse 10a, D-8132 Muelsen (DE)

( * ) Notice: Subject to any disclaimer, the term of this patent is extended or adjusted under 35 U.S.C. 154(b) by 169 days.

(21) Appl. No.: 10/516,044

(22) PCT Filed: May 27, 2003

(86) PCT No.: PCT/DE03/01784

§ 371 (c)(1),
(2), (4) Date: Nov. 29, 2004

(87) PCT Pub. No.: WO03/102446

PCT Pub. Date: Dec. 11, 2003

(65) Prior Publication Data

US 2005/0221945 A1    Oct. 6, 2005

(30) Foreign Application Priority Data

Mar. 31, 2002 (DE) ................................ 102 24 999

(51) Int. Cl.
*F16H 57/08* (2006.01)
(52) U.S. Cl. ..................................................... 475/331
(58) Field of Classification Search ................ 475/331, 475/348; 74/52
See application file for complete search history.

(56) References Cited

U.S. PATENT DOCUMENTS

| 4,158,967 | A | * | 6/1979 | Vatterott ...................... 74/410 |
| 4,966,043 | A | * | 10/1990 | Frey ............................ 74/52 |
| 5,482,015 | A | | 1/1996 | Fish |
| 2002/0091030 | A1 | | 7/2002 | Haga et al. |

FOREIGN PATENT DOCUMENTS

| DE | 1 200 629 | 9/1965 |
| DE | 1 208 586 | 1/1966 |
| WO | 88/08095 | 10/1988 |

OTHER PUBLICATIONS

Johannes Looman: "Zahnradgetriebe" Springer, 3-D Edition, vol. 26, pp. 24, 30, 116, 1996.

* cited by examiner

*Primary Examiner*—Dirk Wright
(74) *Attorney, Agent, or Firm*—Michael J. Striker (57) ABSTRACT

There is described in particular a planetary gear which as is normal has a sun wheel (1), a ring gear (2) and at least one planet wheel (3). According to the invention, the planet wheel (3) is mounted rotatably on a bearing axle (10), which is provided with a power transmission axle (12) which is disposed eccentrically relative to the central axle (14) of the planet wheel (3) and is intended for power input or power output. The same arrangement is in addition described for a gear device which, instead of the sun wheel and ring gear (1, 2), has two parallel linear paths (38, 39).

18 Claims, 10 Drawing Sheets

TRANSMISSION DEVICE COMPRISING AN ECCENTRIC POWER TRANSMISSION AXLE THAT IS DISPOSED ON THE BEARING AXLE

CROSS-REFERENCE TO A RELATED APPLICATION

The invention described and claimed hereinbelow is also described in German Patent Application DE 102 24 999.7 filed on May 31, 2002. This German Patent Application, whose subject matter is incorporated here by reference, provides the basis for a claim of priority of invention under 35 U.S.C. 119(a)–(d).

BACKGROUND OF THE INVENTION

The invention relates to a gear device.

Gear devices of this type are generally configured as planetary gears (for example Johannes Looman "Principles, Constructions, Applications in Vehicles", $3^{rd}$ edition, volume 26). In their simplest constructional form, planetary gears of this type have a first path in the form of the external circumference of a sun wheel, a second path in the form of the internal casing of a ring gear which surrounds the sun wheel and at least one planet wheel which is disposed between these paths and mounted rotatably on a planet carrier (web). The planet wheel is in operational connection at its circumference both with the sun wheel and with the ring gear, by which there should be understood here for example a meshing (toothed gearing) or a rolling assembly (friction gear).

The actuation or power take-off in planetary gears of this type is effected for example in that either in the case of a securely-retained sun wheel, the ring gear is driven, or in the case of a securely-retained ring gear, the sun wheel is driven and the rotational movement which is consequently transmitted by the planet wheel to the planet carrier is used. Conversely however, also the planet carrier can be driven and the consequently produced rotational movement can be transmitted to the sun wheel or ring gear.

The power transmission in the region of the carrier is effected, independently of whether the latter is used as actuation or power take-off element of the gear, via the bearing axle which is situated in the centre of the planet wheel, about which the planet wheel is mounted rotatably on the carrier. Bearing axle and power transmission axle hence coincide.

Deviating therefrom, it is known in the case of crank gears, to dispose a sun wheel and a planet wheel which is in operational connection with the latter on a crank disc, and to provide the planet wheel with a power transmission axle which is disposed eccentrically relative to its bearing axle and is coupled to the one end of a connecting rod (PCT-WO 88/08095). In practice, a serious problem resides thereby in the fact that the power transmission axle does not follow a circular orbit because of the inherent rotation of the planet wheel effected during rotation about the sun wheel, but instead a complicated generally cycloid-type trajectory. This trajectory can indeed be approximated to an elliptical path by optimisation of the sun and planet wheel diameters. However, achievement of a circular orbit which is desired per se is not possible in the case of gears of this type. It would be equally impossible to achieve for example a linear movement path of the power transmission axle in the case where the paths which are disposed on both sides of the planet wheel concern linear paths.

In the case of gears of this type, a circular orbit for the power transmission axle has therefore only been able to be achieved to date when the latter coincides with the bearing axle of the planet wheel, which coincides simultaneously also with the rotational axle of the planet wheel. This has the result that a force exerted upon the power transmission axle is apportioned respectively half to the operational connection between the sun wheel and the planet wheel and to the operational connection between the planet wheel and the ring gear and thus only half can be transmitted to the sun wheel or ring gear and hence be made useful. In addition, the path which is transmitted to the ring gear during a revolution of the planet wheel about the central axle of the planetary gear is always twice as large as the path which the bearing-or power transmission axle of the planet wheel thereby describes about the central axle of the planetary gear. Therefore, during power input or power output at the bearing axle, the result is halving of the forces with doubling of the path covered or vice versa. In other words, of a force exerted upon the power transmission axle, only half is transmitted to the ring gear, which thereby covers twice the path of the power transmitting axle.

These conditions are unalterable with the construction of planetary gears and comparable gears. Numerous inconveniences for practical application arise therefrom, in particular also with respect to the transmissible rotational moments and the possible transmission ratios.

SUMMARY OF THE INVENTION

In contrast, the technical problem of the present invention resides in configuring the gear device of the initially described type such that it can be dimensioned more flexibly than previously, the power transmission can be improved and nevertheless, according to requirements, a circular or linear path for the power transmission axle can be achieved.

In accordance with the present invention, a gear device is proposed containing two parallel paths (16, 17; 38, 39), of which one is disposed in a stationary manner and the other is mounted moveably, at least one planet wheel (9, 40) which is disposed between the two paths (16, 17; 38, 39, 56), is in operational connection at its circumference with the two paths (16, 17; 38, 39, 56) and has a rotational axle (14, 45), a bearing axle (10, 30, 44) which is moveable parallel to the two paths (16, 17; 38, 39, 56) and coaxial with the rotational axle (14, 45), about which bearing axle the planet wheel (9, 40) is mounted rotatably, and a power transmission axle (12, 46) which is disposed eccentrically on the bearing axle (10, 30, 44), the arrangement being such that the planet wheel (9, 40) can transmit, by means of rolling on the path which is disposed in a stationary manner, both movements of the power transmission axle (12, 46) to the moveably mounted path and conversely movements of the moveable path (17, 39, 56) to the power transmission axle (12, 46), characterised in that the power transmission axle (12, 46) is disposed with such a fixed prescribed spacing from the rotational axle (14, 45) that preselected power transmission ratios are produced.

The invention confers the advantage that the power transmission axle can always be guided on a path upon which also the planet carrier is moved, despite its eccentric arrangement upon the bearing axle. In addition, favourable power transmission ratios are produced since the power transmission axle can be disposed, according to requirements, much nearer than previously to the moving path or to the stationary path. The new gear device thereby makes possible many constructions which were not previously achievable and the use of smaller or larger planet wheels and ring gears with otherwise identical ratios.

BRIEF DESCRIPTION OF THE DRAWINGS

The invention is explained in more detail subsequently in conjunction with the attached drawings of embodiments in which there are shown.

DESCRIPTION OF THE PREFERRED EMBODIMENTS

Figure 1:
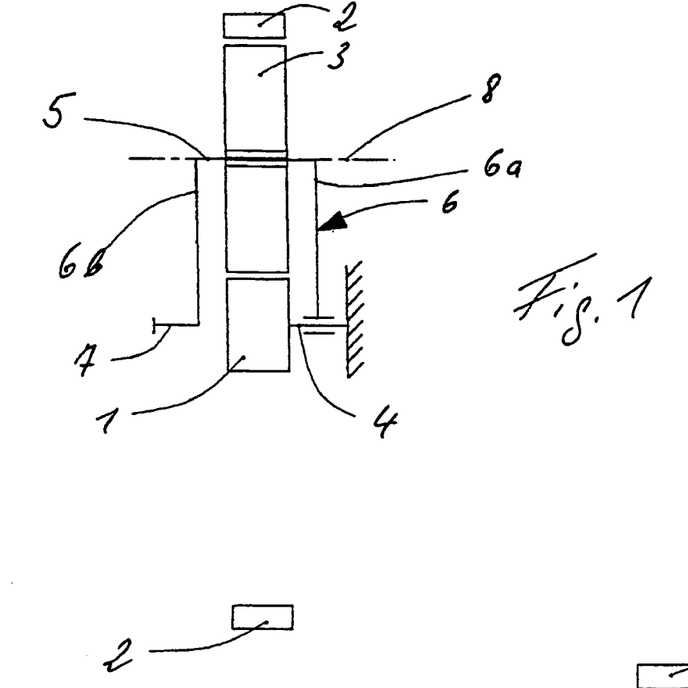
FIG. 1 a schematic representation of a normal planetary gear with stationary sun wheel.

According to FIG. 1, a normal gear device in the form of a planetary gear contains a sun wheel 1, a ring gear 2 and at least one planet wheel 3. The sun wheel 1 is configured here in a stationary manner whilst the ring gear 2 is mounted rotatably about a central axle 4 of the planetary gear. The sun wheel 1 is provided for example with an external toothing which forms a first path which is essentially circular and stationary here whilst the ring gear 2 is provided for example with an internal toothing which forms a second path which is essentially circular and mounted here in a moveable manner, which path is disposed coaxially relative to the first path and surrounds the latter with a pre-selected spacing. Between the two paths, the planet wheel 3 is disposed such that it is in operational connection with the two paths essentially at positions which are diametrically oppositely-situated, in that it is provided for example with an external toothing which meshes with the toothings of the two paths of the sun wheel 1 or ring gear 2.

The planetary gear has furthermore a bearing axle 5 per planet wheel 3, which axle is only schematically represented, is mounted on a planet carrier or web 6 and disposed at a spacing parallel to the central axle 4. The bearing axle 5 or the bearing connected thereto serve for the rotatable mounting of the planet wheel 3. The planet carrier 6 expediently supports the bearing axle 5 on both sides of the planet wheel 3 by arms 6a, 6b which are mounted rotatably about the central axle 4, at least one arm (for example 6b) being able to be made to revolve by a drive shaft 7. This has the result that the planet wheel 3 rolls on the external path of the stationary sun wheel 1 and consequently entrains the ring gear 2 on its internal path and sets it in rotational movement about the central axle 4. Therefore a bearing axle 5 which generally has a small diameter is at the same time a power transmission axle which converts the circular movement of the carrier 6 or the force acting upon the bearing axle 5 of the planet wheel 3 into a corresponding rotational movement of the ring gear 2. In addition, the central axle of the planet wheel 3, which is coaxial with the bearing axle 5, is at the same time the rotational axle 8 thereof, about which a rotational movement is implemented during the circling of the sun wheel 1.

In the described arrangement, the ring gear 2 is moved, during a complete revolution of the bearing or power transmission axle 5 about the central axle 4, along a stretch which corresponds to twice the length of the circle upon which the bearing axle 5 rotates about the central axle 4. Independently of the wheel diameters, $?\cdot d_S + ?\cdot d_H = 2\cdot ?\cdot d_5$ is thereby always valid, in which $d_S$, $d_H$ and $d_5$ are the diameters of the sun wheel 1, of the ring gear 2 and of the circle upon which the bearing axle 5 moves. In addition, of the forces acting on the bearing axle 5, only half are transmitted to the ring gear 2, the ring gear 2 covering twice the stretch compared to the bearing axle 5, because the power transmission or bearing axle 5 lies precisely centrally between those two points at which the planet wheel 3 is in operational connection with the sun wheel or ring gear 1, 2.

Corresponding ratios are produced if the ring gear 2 is stationary and instead the sun wheel 1 is driven or, if by reversal of the power flow, a rotational movement of the sun wheel 2 or of the ring gear 2 is converted into a rotational movement of the planet carrier 6 or of the shaft 7 which is coupled to the latter.

Figure 2:
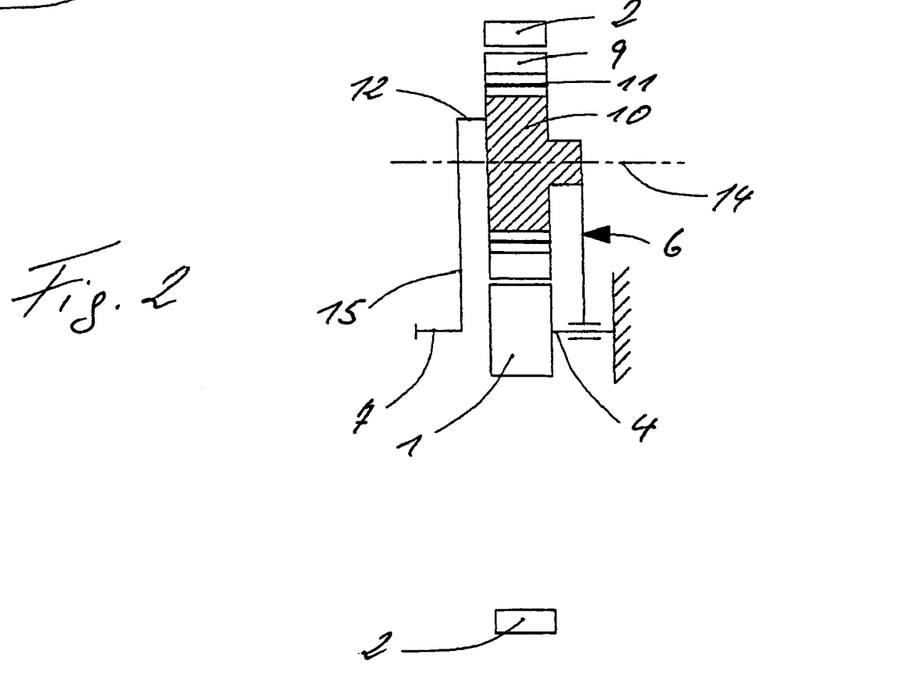
FIG. 2 a schematic representation of a gear device according to the invention in the form of a planetary gear with stationary sun wheel.
Figure 3:
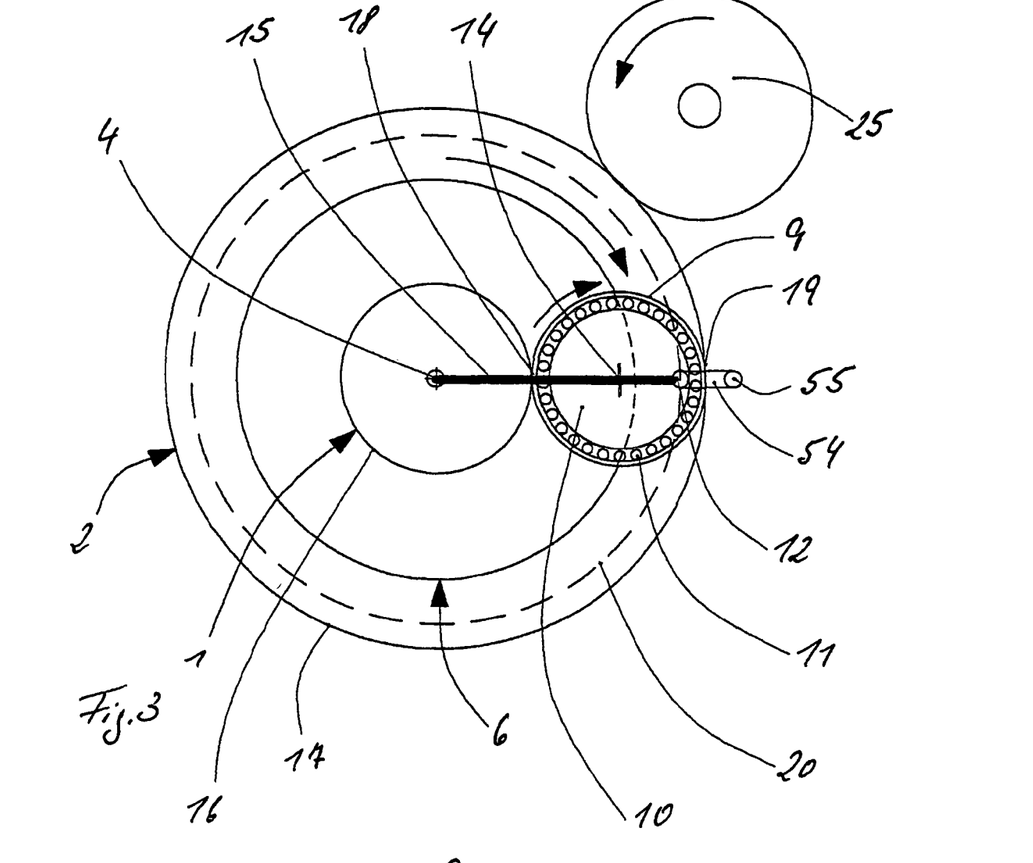
FIG. 3 a schematic cross-section through the planetary gear according to FIG. 2.

In the case of the planetary gear according to the invention represented in FIGS. 2 and 3, the sun wheel 1 and the ring gear 2 are configured as in FIG. 1. The external circumference also of at least one planet wheel 9 corresponds to the planet wheel 3 in FIG. 1. The planetary gear according to FIGS. 2 and 3 differs however from the planetary gear according to FIG. 1 by two essential features. A first distinguishing feature resides in the fact that the planet carrier 6 has one bearing axle 10 per planet wheel 9 respectively, which axle is represented hatched in FIG. 2 and the external diameter of which is only slightly smaller than the external diameter of the planet wheel 9 and thereby is preferably larger than corresponds to half of the external diameter of the planet wheel 9. The planet wheel 9 is thereby configured as a ring and is rotatably mounted on the bearing axle 10 for example by means of a bearing 11 which can be configured as a ball-, needle- or roller bearing or the like. A second distinguishing feature resides in the fact that a power transmission axle 12, which is disposed parallel to the central axle 4 and is disposed eccentrically relative to a central axle 14 (cf. also FIG. 2) of the planet wheel 3, serves for power input or power output. This central axle 14 corresponds to the central axle 8 in FIG. 1 and is at the same time the rotational axle, about which the planet wheel 9 can rotate on the bearing axle 10. According to FIG. 2, the power transmission axle 12 is connected to the drive shaft 7 (FIG. 2) for example via a lever arm 15 or the like. In the case of the gear device according to the invention, the carrier 6 which is rotatable about the central axle 4 of the planetary gear serves hence merely for receiving or mounting the bearing axle 10, whereas the power transmission axle 12 serves as actuation or power take-off member, via which powers can be input or output.

In FIG. 3, the external circumference of the sun wheel 1, which forms a first path 16, is indicated schematically by a circle and the internal circumference of the ring gear 2, which forms a second path 17, is indicated by a further circle. Both paths 16, 17 are disposed coaxially at a spacing which corresponds to the diameter of the planet wheel 9, which is in operational connection at a position 18 with the path 16 and at a position 19 with the path 17 by means of tooth meshing, frictional engagement or the like. If therefore the bearing axle 10 is made to revolve by means of the lever arm 15 (cf. also FIG. 2) which is fitted on the power transmission axle 12, then the planet wheel 9 in fact rolls on the fixed path 16 in the case of a stationary sun wheel 1 as in FIG. 1, whilst it simultaneously sets the ring gear 2 in a rotational movement by means of the operational connection at the position 19. An essential difference from FIG. 1 however resides thereby in the fact that the power transmission axle 12 is disposed with a pre-selected spacing from the rotational axle 14 of the planet wheel 3 and is mounted on the bearing axle 10.

Figure 4:
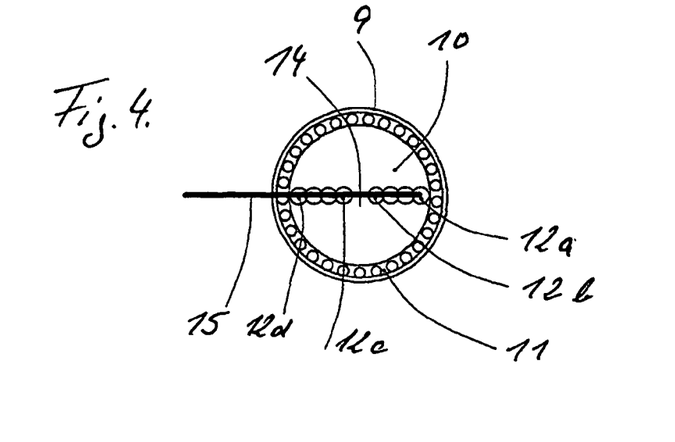
FIG. 4 a bearing axle of the planetary gear according to FIGS. 2 and 3 with a schematically indicated, radially displaceable power transmission axle.

The power transmission axle 12 can technically be produced for example by means of the central axle of a pin which protrudes perpendicularly from the bearing axle 10. According to a particularly preferred embodiment of the invention, this pin, as indicated in FIG. 4, is mounted on the bearing axle 10 displaceably along a diameter, so that the power transmission axle 12 can be disposed according to requirements more or less far from the rotational axle 14 of the planet wheel 3 and can be brought into a multiplicity of possible positions (for example 12a, 12b, 12c or 12d). For this purpose, a pin which produces for example the power transmission axle 12 is disposed displaceably in a diametrically extending groove of the bearing axle 10 and in a fixed manner by a locking screw or the like.

Figure 5:
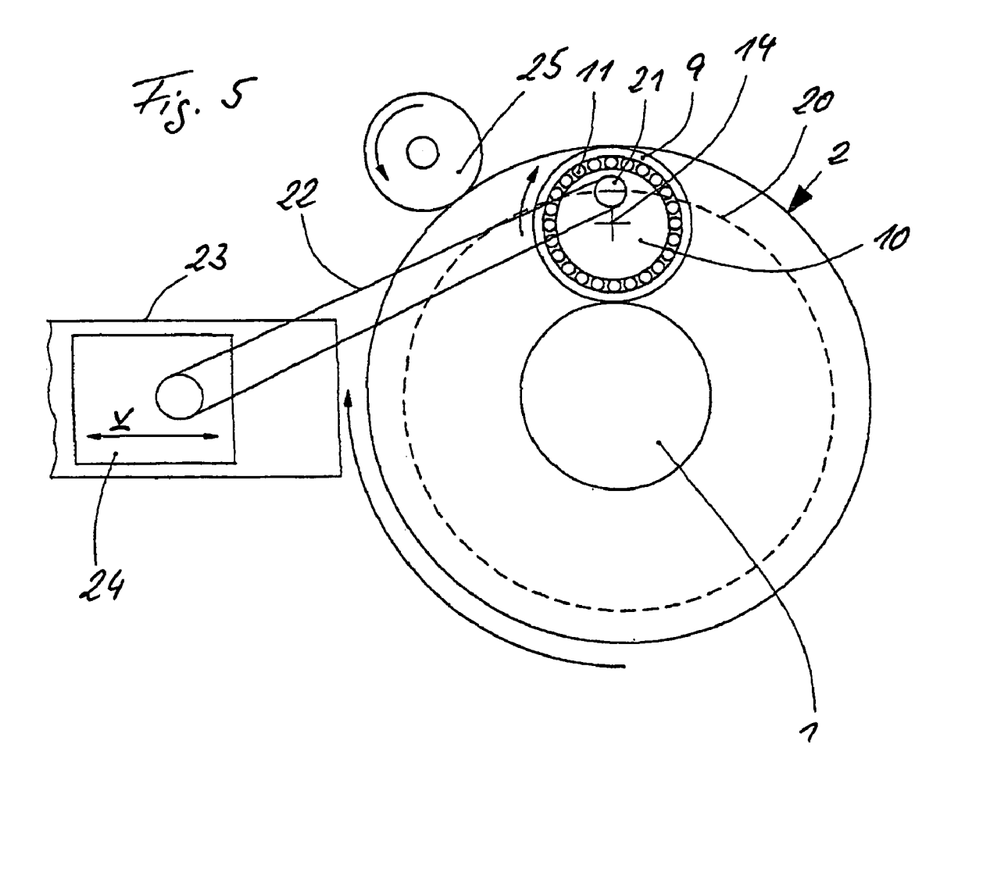
FIGS. 5 and 6 schematic front views of actuation possibilities for the planetary gear according to the invention.

A particular advantage of the planetary gear according to the invention resides in the fact that the power transmission axle 12, independently of where it has been disposed on the bearing axle 10, always describes, during operation of the planetary gear, a circular path 20 about the central axle 4, which circular path is represented in broken lines in FIG. 3. It is therefore readily possible, despite its eccentric arrangement, to drive it in the same manner as in FIG. 1. This is represented for example in FIGS. 5 and 6. In FIG. 5, the power transmission axle 12 is produced as a pin 21 which is connected to a piston 24, which is guided in a cylinder 23, via a connecting rod 22. If the piston 24 is moved to and fro in the direction of a double arrow v, then as a result the pin 21 or the power transmission axle is guided upon the circular orbit 20 with the result that the movements described with reference to FIG. 1 are possible. If this concerns a planetary gear with a stationary sun wheel 1, then for example the ring gear 2 is set in a circulatory rotational movement. This rotational movement can be transmitted to a further wheel 25 of the planetary gear which rolls on the external circumference of the ring gear 2. If conversely the wheel 25 by necessity is driven, this movement can be converted into a to and fro movement of the piston 24. Furthermore, with the wheel 25, any per se arbitrary gearing up or gearing down or rpm change in comparison to the rpm of the ring gear 2 can be brought about.

Figure 6:
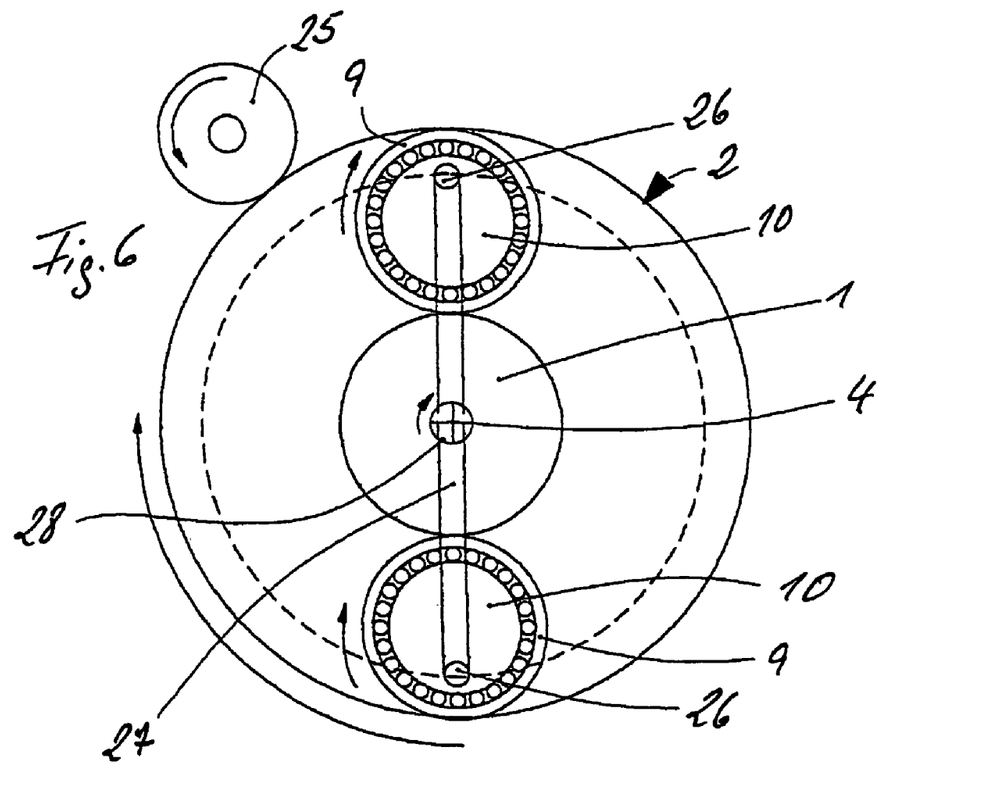

In the embodiment according to FIG. 6, for example two planet wheels 9, which are diametrically oppositely-situated, are mounted rotatably respectively on bearing axles 10 of identical construction on the planet carrier 6. In this example, each bearing axle 10 has a power transmission axle which is produced by a pin 26, which power transmission axle has the same spacing relative to the rotational axle 14 of the respective planet wheel 9. The actuation or power take-off of the planetary gear is effected here in that both pins 26, which are moveable on the circular orbit 20, are connected to each other by means of a connection rod 27, which is mounted on a shaft 28 which corresponds to the shaft 7 in FIG. 1 and is coaxial with the central axle 4 of the planetary gear. The shaft 28 can, according to the case, serve as actuation or power take-off shaft. Furthermore, the device according to FIG. 6 corresponds to that of FIG. 5. Alternatively, the two pins 26 can also have different radial spacings from the central axle 4. In addition, the actuation or power take-off can be effected analogously by means of a connecting rod which acts on one of the pins 26.

Figure 7:
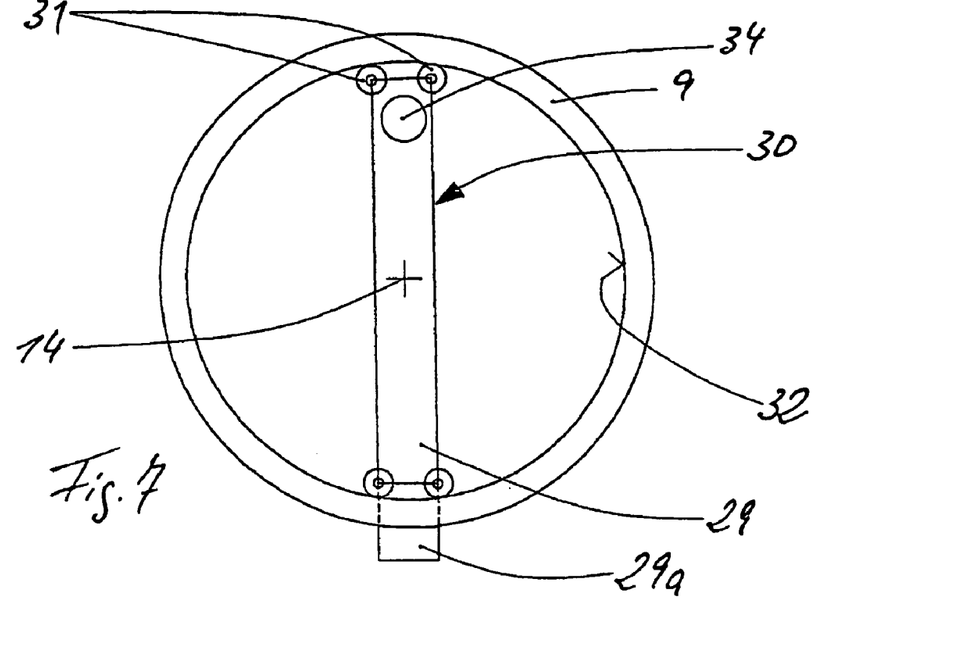
FIGS. 7 and 8 schematic embodiments of bearing axles of the planetary gear according to the invention.
Figure 8:
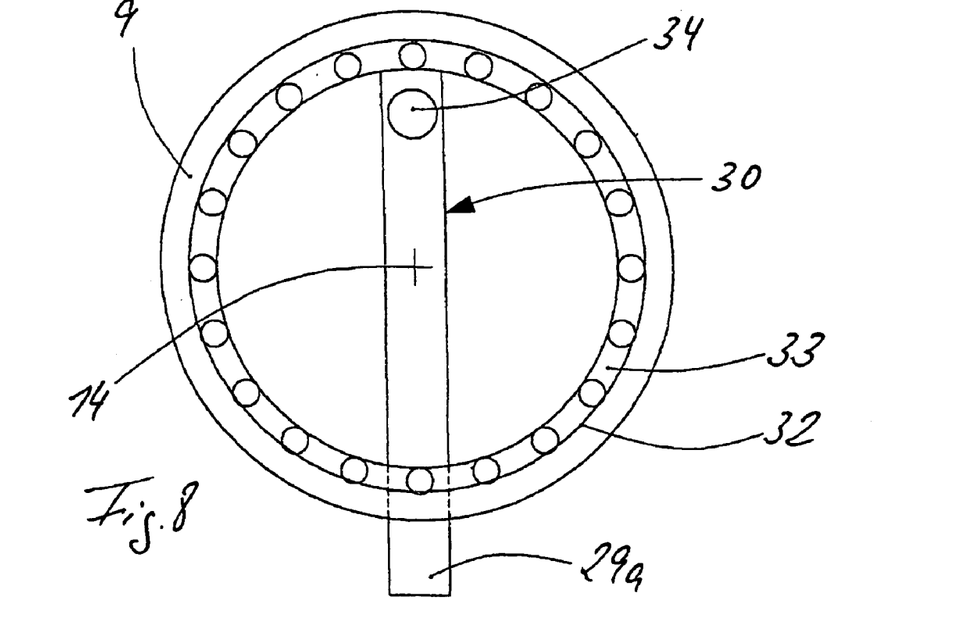

FIGS. 7 and 8 show two alternative embodiments for the constructional configuration of the bearing axle 10, which is configured in FIG. 2 to 6 as a cylindrical disc. As FIG. 7 shows, the cylindrical disc can be replaced by a component which is configured for example as a flat bar 29. As a result, a bar-shaped bearing axle 30 is obtained, which is provided at its ends with individual bearing elements 31 in the form of bearing balls, rollers or the like, on which a cylindrical internal casing 32 of the annular planet wheel 9 can roll. Simultaneously, the bearing axle 30 can be connected to the carrier 6 by means of an extension 29a of the flat bar 29. On the other hand, in the case of the embodiment according to FIG. 8, a corresponding bar-shaped bearing axle 30 serves as carrier of the internal ring of a normal ball bearing 33, on the external ring of which the internal casing 32 of the planet wheel 9 is mounted. Furthermore, the arrangement according to FIG. 8 corresponds to that of FIG. 7. In both cases, the power transmission axle 12 is produced by means of a pin 34 which is coaxial thereto and is disposed eccentrically relative to the central or rotational axle 14 of the planet wheel 9.

Figure 9:
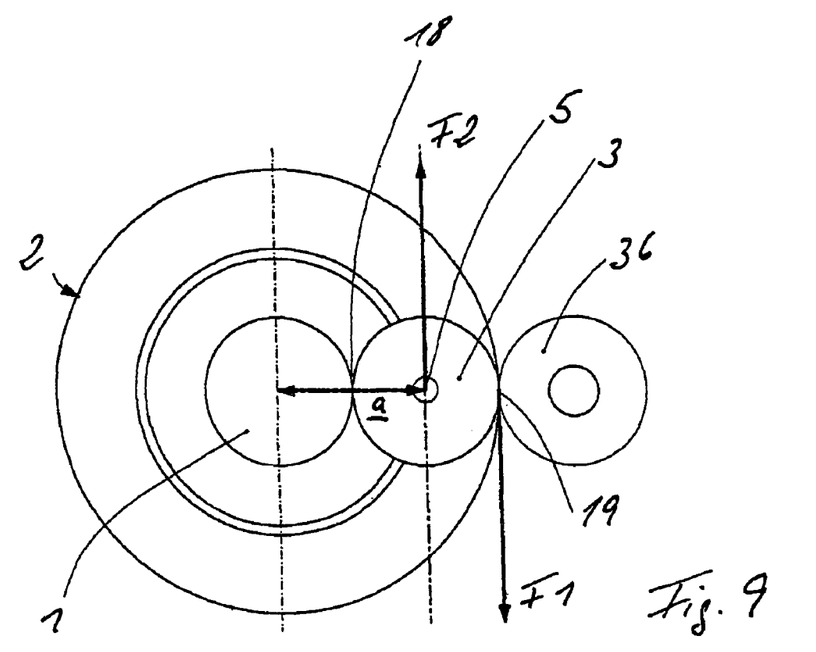
FIG. 9 to 11 in a schematic comparison, the front views respectively of a known planetary gear and one according to the invention and of a known crank gear.
Figure 10:
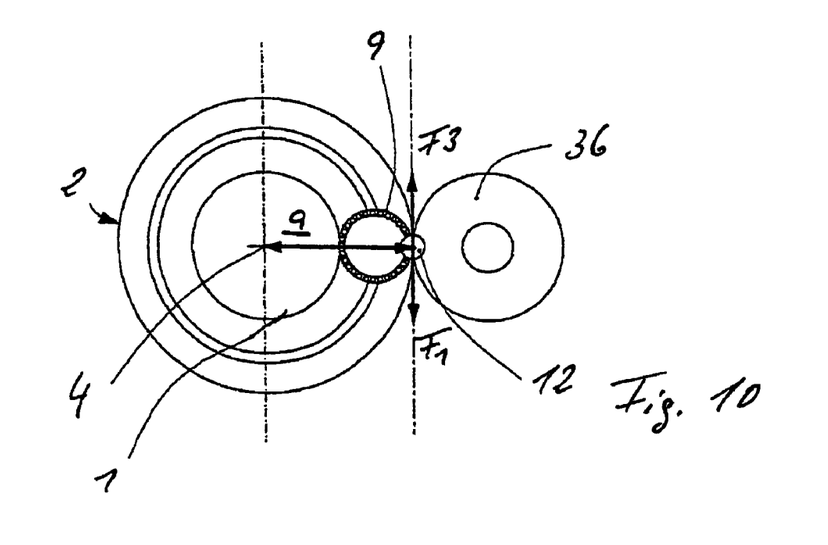
Figure 11:
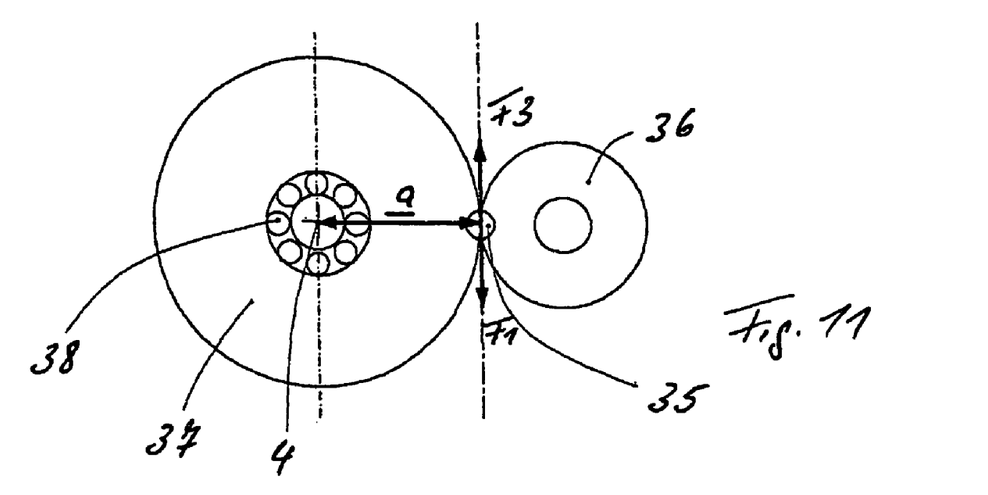

FIG. 9 to 11 show the functions which are important for the invention of a normal planetary gear (FIG. 9), of a planetary gear (FIG. 10) according to the invention and of a normal crank drive (FIG. 11). It is thereby a prerequisite in all three cases that the power transmission axle 5, 12 or 35 (FIG. 11) has the same spacing a from the central axle 4 of the gear and an additional actuation or power take-off wheel 36, which is configured analogously to FIG. 5 and FIG. 6, has the same diameter. In addition, for the sake of simplicity, it is assumed for the position of the power transmission axle 12 or 35 that this has the greatest possible spacing from the central axle 4 and hence, in FIGS. 10 and 11, also has the greatest possible eccentricity.

For the known planetary gear according to FIG. 9, the dimensioning of the sun wheel 1 and of the ring gear 2 is chosen such that a transmission ratio of 1:4 is produced for the wheel 36. For a static state, which is taken by way of example and obvious from FIG. 9, it is true in addition that a force F1 which acts on the external circumference of the ring gear 2 at the position 19 according to FIG. 3 (operational engagement between ring gear 2 and planet wheel 3) must be maintained in equilibrium by means of a force F2 which is counter-directed, acts on the power transmission axle 5 and is twice as big as the force F1 with F2=2·F1.

In the embodiment according to the invention according to FIG. 10, only a force F3=F1 is required on the other hand in the case of the identical spacing a in order to compensate for a corresponding force F1. In addition, here both the diameter of the ring gear 2 and the diameters of the planet wheels 3 can be considerably reduced. The ensuing transmission ratio is 1:3 for the wheel 36. Because F1=F3, also the respective paths are the same instead of twice as big as in FIG. 9.

In the case of a gear device according to FIG. 11 configured as a crank drive, in which a crank disc 37 is mounted rotatably on a central bearing 38 and is provided at the circumference with the power transmission axle 35, a transmission ratio of 1:2 is produced in the case of identical power transmission as in FIG. 10.

An essential advantage of the planetary gear according to the invention, which is produced directly from FIGS. 9 to 11, resides in the fact that by moving the power transmission axle 12 in the direction of FIG. 4 with otherwise identical dimensions, completely different power transmission ratios can be produced. Instead of the previous non-variable power distribution of 1/2 to 1/2 at the positions 18, 19 in FIG. 9, in the case of the gear according to the invention, any other distributions are provided, which lead to correspondingly different diameters of the circular orbit 20 (FIG. 3), upon which the power transmission axle 12 moves. Theoretically, the power distribution can be varied in the case of the gear according to the invention between 1:0 and 0:1, according to whether the power transmission axle 12 is positioned at the position 18 or at the position 19. In the case of a particularly advantageous variant, the arrangement is therefore such that the power transmission axle 12 can be displaced, even with an operating planetary gear, between the two possible extreme positions according to requirements. An arrangement of the power transmission axle 12 in the vicinity of the sun wheel could thereby be advantageous for producing braking forces in the case of a fixed sun wheel 1 or for improving the power transmission in the case of a stationary ring gear 2. In a similar fashion, by means of enlargement of the sun wheel 1 and simultaneous reduction of the planet wheel 9, an rpm change can be produced which would, in the case of the smallest conceivable planet wheel, be approximately 1:4. In addition to the advantage that the power transmission axle 12 is always moved upon a circular orbit (for example 20), independently of its position on the bearing axle 10, the advantage of high flexibility is hence also produced with the choice of the different gear parts since, differing from previous practice, it is not two pre-selected gears which determine all other gear parts. Apart from that, it is clear that the power transmission axle 12 can be placed respectively only as far on the external circumference of the bearing axle 10 as is possible on practical grounds.

The operating principle of the gear device according to the invention described with reference to FIG. 2 to 11 can in an analogous manner also be applied to gears with linear paths instead of circular orbits. This is described subsequently by way of example with reference to FIG. 12 to 14.

Figure 12:
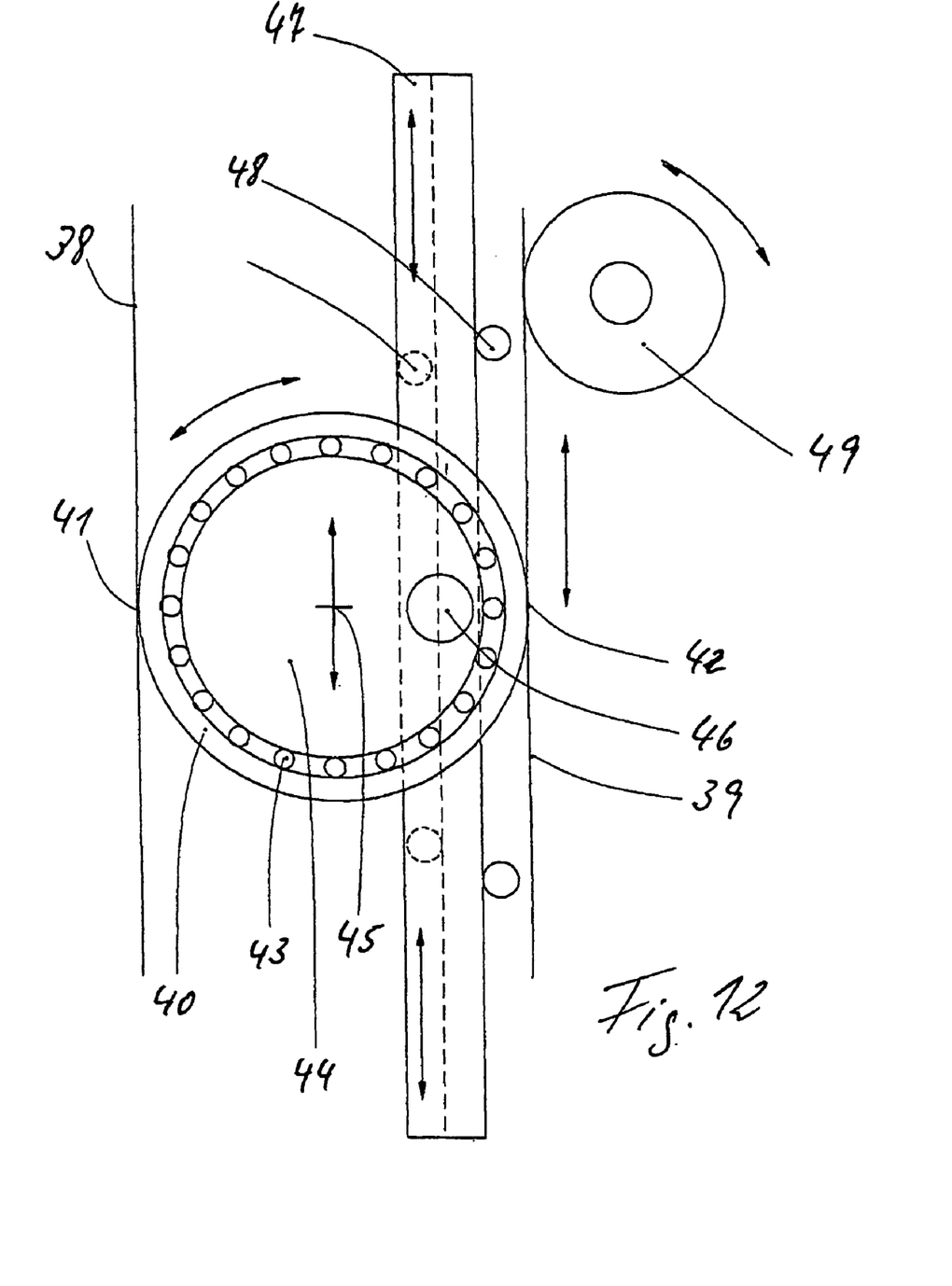
FIG. 12 a schematic front view of a gear device according to the invention in linear arrangement.

FIG. 12 shows a first, linear path 38, disposed in a stationary manner, which can be conceived of as a development of the external circumference of the sun wheel 1 or of the path 16 according to FIG. 3. Situated parallel, opposite and at a spacing thereto, is a second, likewise linear, movably mounted path 39, which can be conceived of as a development of the internal circumference of the ring gear 3 or of the path 17 according to FIG. 3. A planet wheel 40 is disposed between the two paths 38, 39, the circumference of which is in operational connection on the one hand at a position 41 with the stationary path 38 and on the other hand at a position 42, which is diametrically oppositely-situated, with the moveable path 39. The planet wheel 40 is configured as a narrow ring analogously to FIG. 2 to 11, which ring is mounted rotatably on a bearing axle 44 by means of a bearing 43, the external circumference of which bearing axle is preferably only slightly smaller than corresponds to the external diameter of the planet wheel 40. A central axle 45 of the bearing axle 44 is simultaneously the rotational axle of the planet wheel 40. The bearing axle 44 can be mounted on a carrier which is mounted displaceably parallel to the paths 38, 39 and is not represented in more detail.

Analogously to FIG. 2 to 11, the bearing axle 44 is provided in addition with a power transmission axle 46 which is disposed eccentrically relative to the central or rotational axle 45 of the planet wheel 40, which power transmission axle 45 is produced for example as a pin, which protrudes perpendicularly from the bearing axle 44 which is configured as a circular disc. Finally, a guide element 47 serves for actuation or power take-off, which guide element is displaceable parallel to the paths 38, 39, is coupled to the power transmission axle 46 or to the pin and is displaceably mounted in the corresponding bearings 48. The linear movement which is introduced by the guide element 47 can be converted into a rotational movement by means of a wheel 49 which is in operational connection with the external side of the moveable path 39, and conversely the rotational movement of the wheel 49 can also be converted into a linear movement of the guide element 47. With respect to the power transmission and the paths to be covered, the same principles apply as have been explained above with reference to FIG. 1 to 11. In particular, the guide element 47 is configured and guided by means of the bearings 48 such that on the one hand it can only be moved parallel to the paths 38, 39, on the other hand the power transmission is effected from the guide element 47 to the bearing axle 44 or, conversely, in the region of the power transmission axle 46, or the force direction parallel to the paths 38, 39 extends through the power transmission axle 46. Hence the guide element 47 and the bearing axle 44 can also be produced in one piece without configuring a bearing pin. In order that no undesired lever effects are obtained between the guide element 47 and the bearing axle 44 or the bearing pin 46, the central axle thereof is expediently precisely upon a line 47a, which is indicated in broken lines and along which the guide element 47 acts on the balls or the like of the bearings 48 or vice versa.

Figure 13:
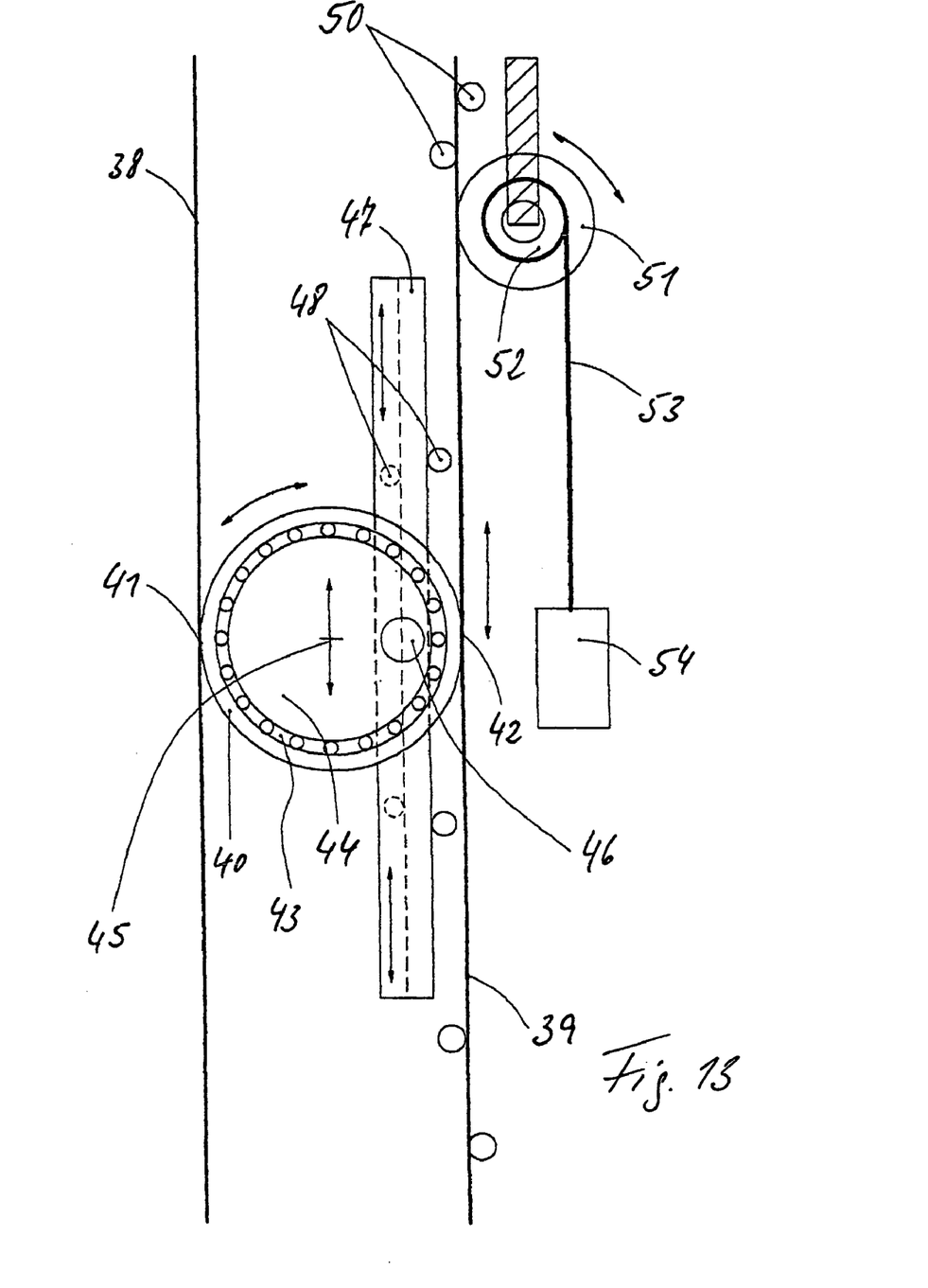
FIGS. 13 and 14 schematic front views of two further embodiments of a gear device according to the invention in linear arrangement.

The embodiment according to FIG. 13 corresponds essentially to the embodiment according to FIG. 12, as a result of which the same parts are provided with the same reference numbers. Additionally to FIG. 12, bearings 50 for guidance of the moving path 39 are represented schematically. In addition, a cable winch 51, mounted in a stationary manner, is represented schematically, which cable winch corresponds to the wheel 49 in FIG. 12 and is in operational connection with the moving path 39. The cable winch 51 contains a winding body 52 for a cable 53, which can be wound up by means of displacement of the guide element 47 onto the winding body 52 or can be unwound from the latter. At the cable end, there is situated a load 54, by means of which it is intended to be indicated that the gear device according to the invention according to FIG. 13 can be used for example in the manner of a hoist for lifting loads.

Figure 14:
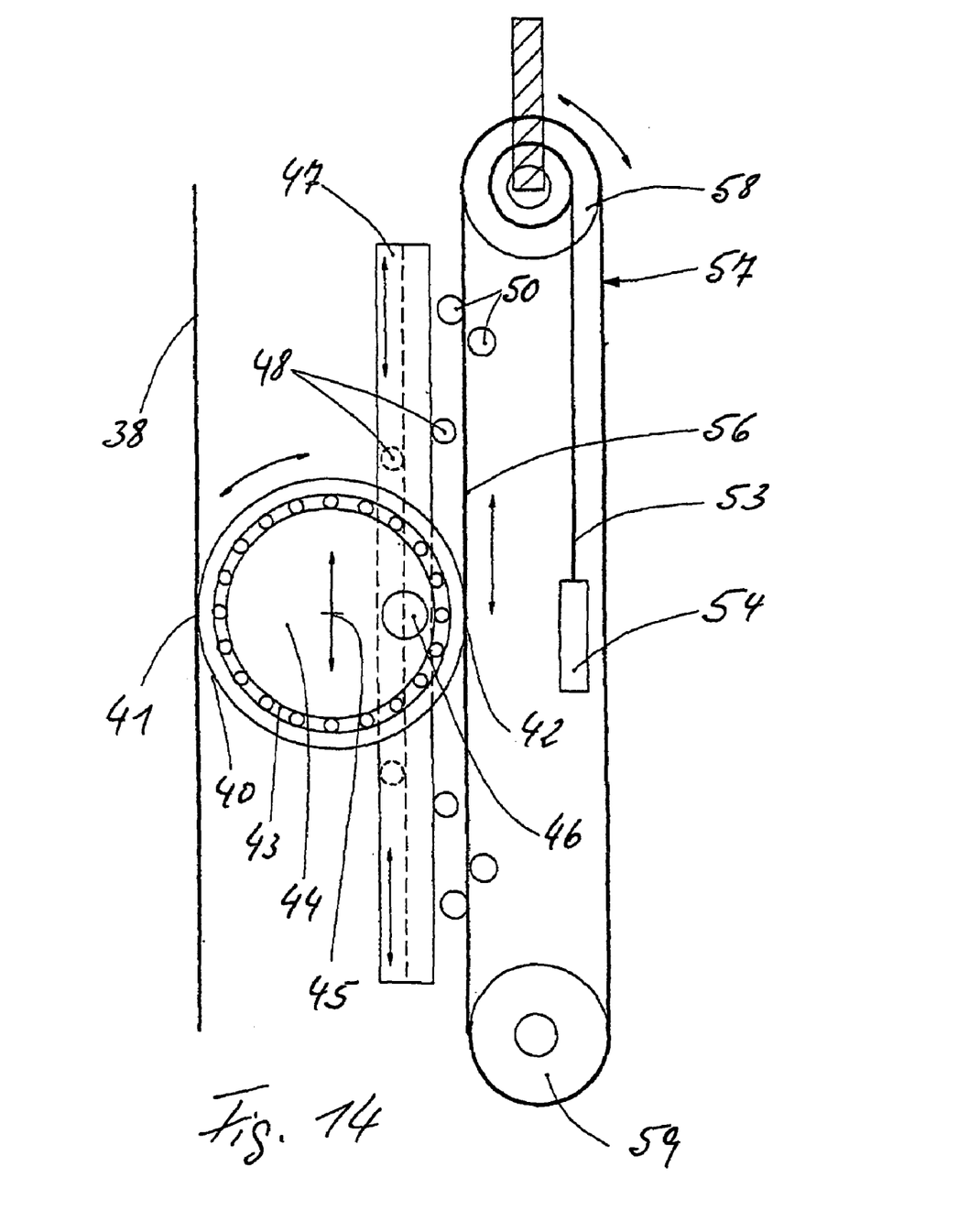

The embodiment according to FIG. 14 corresponds essentially to the embodiment according to FIG. 13, as a result of which the same parts are provided with the same reference numbers. Differing from FIG. 13, a moveable path 56 is configured as the straight strand of an endless element 57 in the form of a chain, a cable or a belt. The element 57 is guided in a circulating manner upon two deflection wheels 58, 59 (chain wheels or pulleys). One of these deflection wheels is configured as a cable winch analogously to FIG. 13 and is provided with the winding body 52 for the cable 53. The planet wheel 40 is provided with an external toothing for the case where the element 57 is a chain, which toothing engages directly in the chain strand which is in operational connection therewith, whilst the path 38 in this case is a toothed rack. If the element 57 comprises a belt, the planet wheel 40 is configured as a friction roller or the like and the path 38 is configured as a rolling path.

The invention is not restricted to the described embodiments which can be modified in many ways. This is true in particular for the dimensionings and relative arrangements of the various parts to each other which are indicated by way of example. The planetary gear can for example also be equipped with more than one or two planet wheels. Furthermore, the bearing axle can be configured differently than is indicated in FIGS. 3, 7 and 8. In particular, it is possible to configure the bearing axle in a multipart manner. It can thereby be particularly expedient to provide it with two coaxial parts which are situated axially one behind the other and are connected to each other by means of a spring element. Hence forces which impact upon one of the parts can be cushioned, before they act upon the other part. In addition it can be advantageous to configure the ring gear 2 on the external circumference as actuation or power take-off element, in that it is provided for example with a circumferential toothing or the like. Alternatively however, the actuation or power take-off element can also comprise a plurality of wheels which are disposed coaxially one behind the other and provided with different diameters, in particular toothed wheels, in order to make different transmission ratios possible in a simple manner. The planet carrier 6 can also be configured, instead of as a circular disc as is indicated in FIG. 3, also as a lever arm or in some other way. Furthermore, it is clear that the paths 38, 39 in FIG. 12 to 14 need not be configured exactly straight, but can extend also along an arc. The paths 38, 39 can thereby comprise for example toothed racks, chains, rolling faces or the like, which are in operational connection with the planet wheels 40 in the form of toothed- or frictional wheels. Furthermore, it is clear that the power transmission ratios can be improved further in that a crank 54 with a crank arm 55 which is disposed parallel to the power transmission axle 12 is attached to the power transmission axle 12, as is indicated in FIG. 3. Finally it should be understood that the different features can be applied also in combinations other than those described and represented.

The invention claimed is:

1. Gear device, containing: two parallel paths (16, 17; 38, 39), of which one is disposed in a stationary manner and the other is mounted moveably, at least one planet wheel (9, 40) which is disposed between the two paths (16, 17; 38, 39, 56), is in operational connection at its circumference with the two paths (16, 17; 38, 39, 56) and has a rotational axle (14, 45), a bearing axle (10, 30, 44) which is moveable parallel to the two paths (16, 17; 38, 39, 56) and coaxial with the rotational axle (14, 45), about which bearing axle the planet wheel (9, 40) is mounted rotatably, and a power transmission axle (12, 46) which is disposed eccentrically on the bearing axle (10, 30, 44), the arrangement being such that the planet wheel (9, 40) can transmit, by means of rolling on the path which is disposed in a stationary manner, both movements of the power transmission axle (12, 46) to the moveably mounted path and conversely movements of the moveable path (17, 39, 56) to the power transmission axle (12, 46), characterised in that the power transmission axle (12, 46) is disposed with such a fixed prescribed spacing from the rotational axle (14, 45) that preselected power transmission ratios are produced.

2. Gear device according to claim 1, characterised in that the bearing axle (10, 30, 44) has a diameter which is between 0.5 times and 1 times the value of the diameter of the planet wheel (9, 40), and in that the planet wheel (9, 40) is configured as a ring which is mounted rotatably on the bearing axle (10, 30, 44).

3. Gear device according to claim 1, characterised in that the spacing of the power transmission axle (12, 46) from the rotational axle (14, 45) can be altered.

4. Gear device according to claim 1, characterised in that it is configured as a planetary gear.

5. Gear device according to claim 4, characterised in that the path (16) which is disposed in a stationary manner is formed by the external circumference of a sun wheel (1) and the moveably mounted path (17) is formed by the internal circumference of a ring gear (2) of the planetary gear.

6. Gear device according to claim 5, characterised in that the path (17) which is disposed in a stationary manner is formed by the internal circumference of a ring gear (2) and the moveably mounted path (16) is formed by the external circumference of a sun wheel (1) of the planetary gear.

7. Gear device according to claim 4, characterised in that the bearing axle (10) is mounted on a planet carrier (6) which is mounted rotatably about the central axle (4) of the planetary gear.

8. Gear device according to claim 4, characterised in that the power transmission axle (12) is configured as a pin (26) which protrudes from the bearing axle (10) and is coupled to a connection lever (27), which is positioned on a drive shaft (28) which is mounted rotatably about the central axle (4) of the planetary gear.

9. Gear device according to claim 4, characterised in that the power transmission axle is configured as a pin (21) which protrudes from the bearing axle (10) and is coupled to a connecting rod (22) of a crank drive.

10. Gear device according to claim 4, characterised in that the ring gear (2) is configured on the external circumference as actuation or power take-off element.

11. Gear device according to claim 10, characterised in that the actuation or power take-off element has a plurality of actuation or power take-off wheels which are disposed coaxially one behind the other and provided with different diameters.

12. Gear device according to claim 10, characterised in that it contains at least one rotatable wheel (25) which is in operational connection with the actuation or power take-off element.

13. Gear device according to claim 1, characterised in that both paths (38, 39, 56) have a linear or arcuate configuration.

14. Gear device according to claim 13, characterised in that it contains a bar-shaped guide element (47) which is mounted displaceably parallel to the paths (38, 39, 56) and is coupled to the bearing axle (44) in the region of the power transmission axle (46).

15. Gear device according to claim 13, characterised in that the guide element (47) is mounted in bearings (48) in order to avoid undesired lever effects between it and the power transmission axle (46), the lines of action (47*a*) of which bearings are essentially in the same plane as the power transmission axle (46).

16. Gear device according to claim 13, characterised in that it contains at least one rotatable actuation or power take-off wheel (49, 51) which is in operational connection with a side of the moveable path (39) which is orientated away from the planet wheel (40).

17. Gear device according to claim 13, characterised in that the paths (38, 39, 56) are configured as toothed racks, chains, cables or rolling faces.

18. Gear device according to claim 1, characterised in that the bearing axle (10, 30, 44) comprises at least two parts which are coupled by means of a spring.

* * * * *